United States Patent [19]
McLaughlin

[11] 3,973,236
[45] Aug. 3, 1976

[54] HORIZONTAL HYDROPHONE ARRAY
[75] Inventor: Robert B. McLaughlin, La Jolla, Calif.
[73] Assignee: Lockheed Missiles & Space Company, Inc., Sunnyvale, Calif.
[22] Filed: Dec. 23, 1974
[21] Appl. No.: 535,831

[52] U.S. Cl. .............................. 340/7 PC; 340/3 T; 340/3 PS; 114/235 B; 114/209
[51] Int. Cl.² ........................................... G01V 1/38
[58] Field of Search ................ 340/3 T, 3 PS, 7 PC; 114/235 B, 209

[56] References Cited
UNITED STATES PATENTS

| 2,969,036 | 1/1961 | Brown | 340/3 T |
| 3,298,347 | 1/1967 | Swain et al. | 114/235 B |
| 3,926,137 | 12/1975 | Johnson | 114/209 |

FOREIGN PATENTS OR APPLICATIONS

| 382,590 | 10/1932 | United Kingdom | 114/209 |

*Primary Examiner*—Nelson Moskowitz
*Attorney, Agent, or Firm*—H. Donald Volk; Billy G. Corber

[57] ABSTRACT

A system for maintaining a two-legged hydrophone array in a horizontal plane is disclosed. This system uses a pair of directional maneuverable drogue chutes for providing tension on the hydrophone arrays and for maintaining the desired angle between the two legs.

11 Claims, 4 Drawing Figures

HORIZONTAL HYDROPHONE ARRAY

BACKGROUND OF THE INVENTION

A technique for surveying subsea strata is to tow a number of hydrophones behind a boat over the area to be surveyed. The hydrophones are mounted in some geometric pattern. An echo-producing impulse, such as an explosive blast or the like, is generated in the vicinity of the hydrophones. The sound from the impulse means is echoed back from the seabottom and the underlying strata to the hydrophones. The outputs from the hydrophones are connected to recording equipment that records the outputs to indicate the profile or character of the area being surveyed.

A variety of cable suspension arrangements and hydrophones have been developed. An early attempt to position a string of hydrophones was to position the hydrophones on the surface of the water. Because of the surface noise generated by wave action and the noise generated by the slapping of the waves on the cable, it was determined that surface mounted hydrophones were unsatisfactory and that satisfactory results might be obtained by submerging the hydrophones below the surface of the water.

One underwater system mounts a number of hydrophones on a vertical cable which is supported on the upper end by a float and weighted on the bottom end with a weight. It was discovered that the drift of this hydrophone array caused by ocean currents produced mechanical vibrations on the supporting cable which, in turn, caused the hydrophone array to be subjected to unwanted spurious signals. This mechanical vibration is commonly referred to as "strumming".

Another technique is to utilize a nonfloatable support cable which is maintained in a substantially horizontal position beneath the surface of the water by the velocity of a towing ship. The hydrophones were mounted along the length of the cable. It was discovered that undesirable noise was produced in this system by the vertical motion of the hydrophones in the water which caused the hydrophones to be subjected to varying water pressure. The hydrophones were unable to distinguish between the varying pressure caused by this vertical movement and the varying pressure caused by the explosive blast impulse.

A number of other techniques were developed by the prior art in an attempt to overcome these problems. One approach was to utilize a buoyant cable in an attempt to suspend the hydrophones at a predetermined distance beneath the surface of the water. However, the movement of the ship caused the hydrophones to rise above the desired depth. Therefore, whenever it was desired to make a reading, the tow ship would have to stop and the cable and hydrophones allowed to reach the equilibrium state before a seismic reading could be made. The ship would then restart and move to the next position. This increased the time and hence the cost of surveying the ocean bottom. To reduce the time between seismic surveys, a paravane was used to maintain sonobuoys in a predetermined array during the movement of the ship. See U.S. Pat. No. 1,305,483 and U.S. Pat. No. 3,491,848. However, the paravane could maintain the array of sonobuoys in the predetermined shape and depth only when the towing vessel was moving at a relatively high rate of speed. The movement of the towing vessel at this high rate of speed again caused strumming of the supporting cable.

The system according to this invention overcomes these problems by providing means for maintaining sufficient tension on the suspension cable to maintain the hydrophones in a pair of straight lines that lie within the horizontal plane without requiring that the hydrophone array be towed at excessive speeds. This causes a reduction of the mechanical and fluid noise problems and permits the utilization of a much more efficient hydrophone array at a substantial reduction in cost.

DESCRIPTION OF THE DRAWING

For a more complete understanding of the present invention, reference may be had to the following description taken into conjunction with accompanying drawings, in which.

DESCRIPTION OF THE PREFERRED EMBODIMENT

Figure 1:
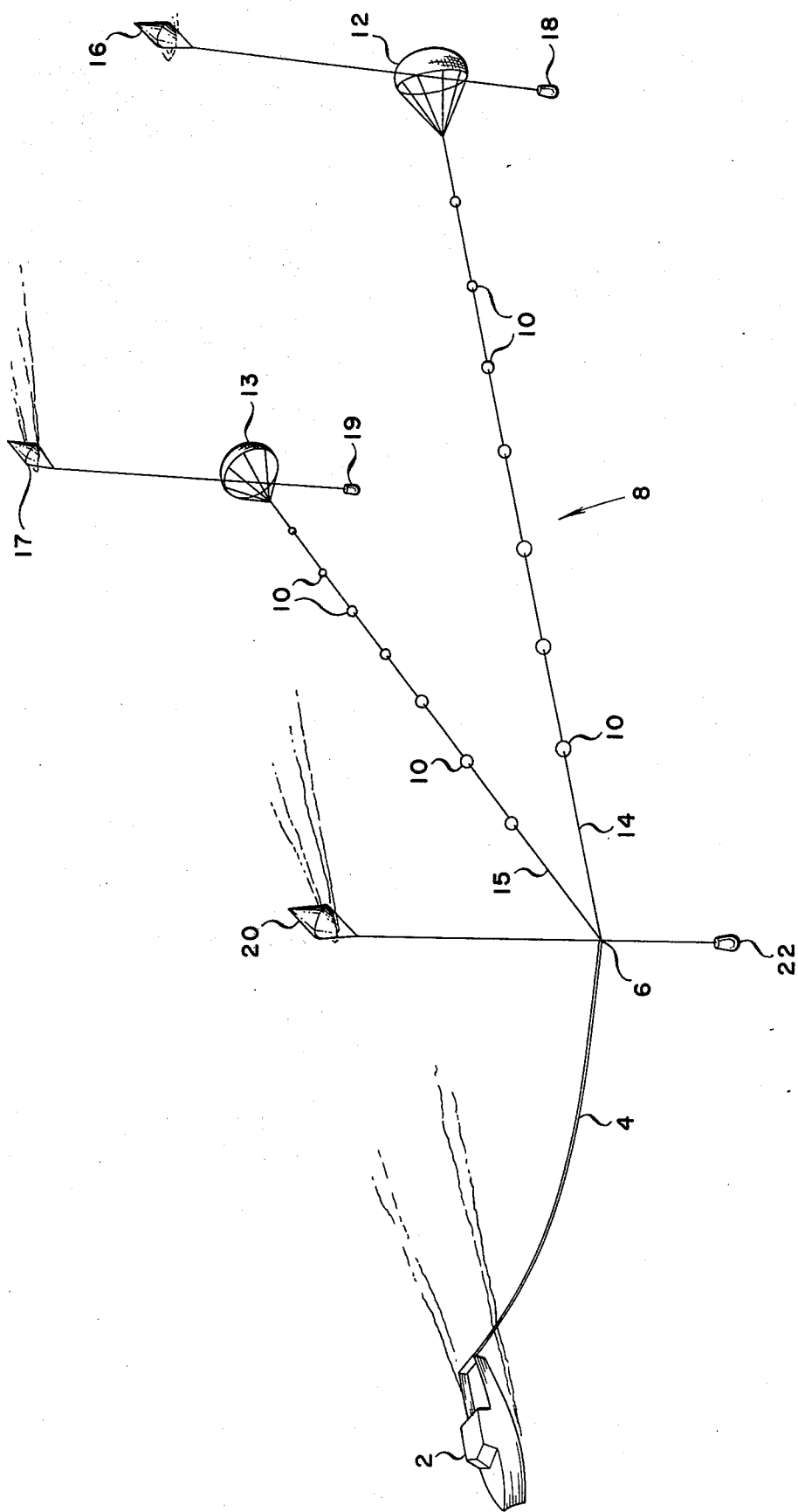
FIG. 1 is a diagrammatic representation of one embodiment of the invention.

Referring to FIG. 1, the surveying equipment is towed over the area to be surveyed by the towing means, such as ship 2. A tetherline or painter 4 is connected between the ship 2 and the apex 6 of a two-legged hydrophone array 8. Each leg of the hydrophone array 8 contains a suitable number of conventional hydrophones 10 connected by electrical conductors to recording equipment, not shown.

A maneuverable drogue chute 12 is connected to the trailing end of the left leg 14 of hydrophone array 8. Similarly, a maneuverable drogue chute 13 is connected to the trailing end of the right leg 15 of the hydrophone array 8. Drogue chutes 12 and 14 maintain tension on the respective legs of the hydrophone array as well as maintaining the predetermined angle between the two legs. The buoyant lift means 16 and a weight means 18 are connected to the left drogue chute 12. Similarly, buoyant lift means 17 and weight means 19 are connected to the right drogue chute 13. Buoyant lift means 20 and weight means 22 are connected to the apex 6 to maintain the apex at the desired working depth.

Figure 2:
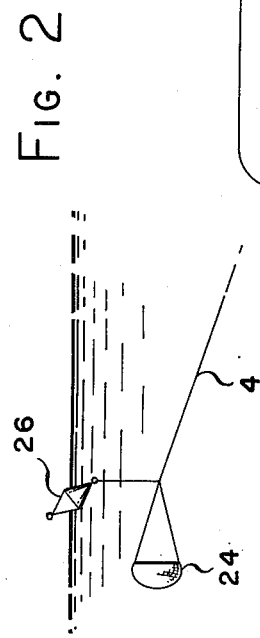
FIG. 2 is a diagrammatic representation of an alternate towing means for the hydrophone array.

FIG. 2 shows an alternate towing means attached to painter 4. A parachute 24 is maintained at a shallow depth by buoyant means 26. Parachute 24 has a large enough area to properly tension the hydrophone array 8. Since the current close to the surface is affected by wind, and the current at the desired depth is not, there is an effective force tending to pull the hydrophone array in the direction of the wind driven current. The sizes of parachute 24 and drogue chutes 12 and 14 are chosen so that the two-legged hydrophone array 8 is towed over the area to be surveyed at a predetermined speed, such as one eighth of a knot. For example, a fifteen-foot diameter parachute 24 and thiry-foot diameter drogue chutes 12 and 14 are suitable for a 2,000-foot-long array.

Figure 3:
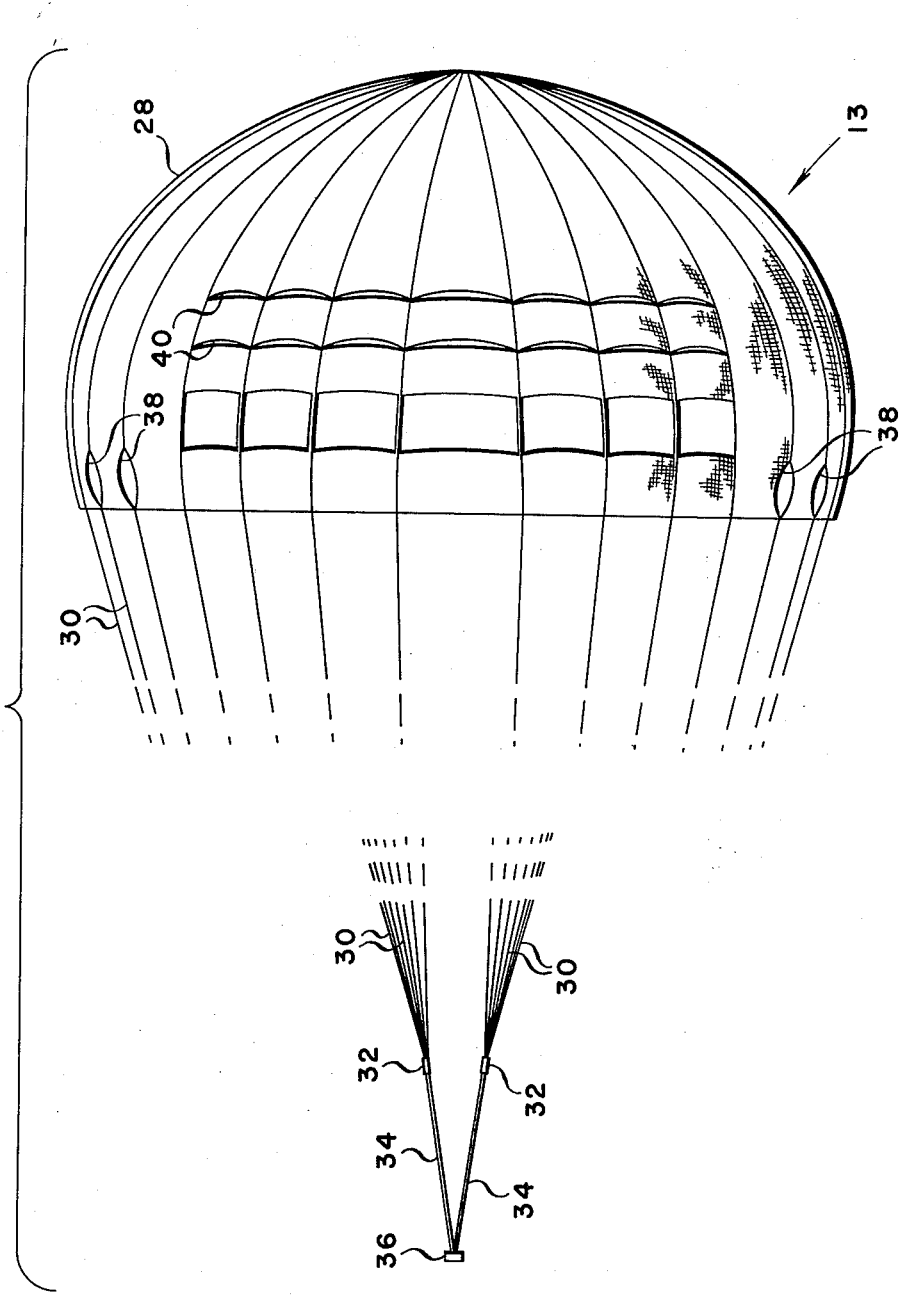
FIG. 3 is an enlarged side view of the left drogue chute used in this invention.
Figure 4:
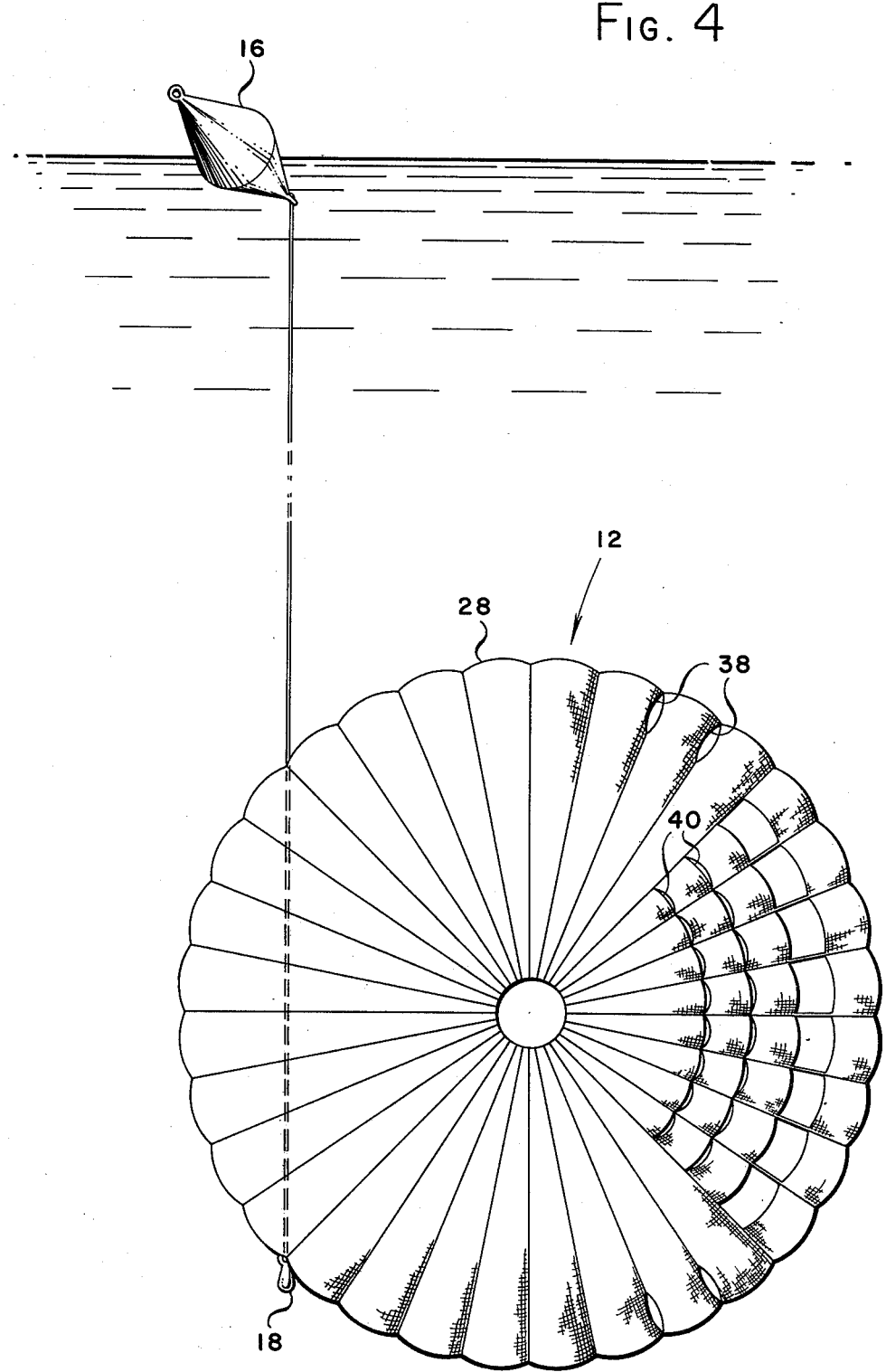
FIG. 4 is an enlarged front view of the left drogue chute of FIG. 2.

FIGS. 3 and 4 are an enlarged view of the left drogue chute used in this invention. The drogue chute, such as Model Number 1008, manufactured by P. F. Smith Parachute Company, includes shroud lines 30 that are connected to hemispheric canopy 28. The other end of shroud lines 30 terminate in a pair of rings 32 that are attached to harness 36 by risers 34. Slot vents in canopy 28 assist in stabilizing the drogue chutes. A series of maneuvering vents 40 form one side of canopy 28. A weight line 42 is connected to the pair of shroud lines on the other side of the canopy. Weight 18 can be connected directly to the weight line and the canopy as shown or can be suspended below the canopy 28 if desired.

The large drogue chute traps hundreds of tons of water inside its canopy 24. It would therefore require a large force to physically move the drogue chute; however, because the drogue chutes have a hemispheric shape they offer very little resistance to rotation of the drogue chute about its axis. It is this feature which permits the use of a very small buoyant means 16 and weight 18 to control the orientation of the drogue chute about its horizontal axis of symmetry.

The direction in which the drogue chute vents water coming into its canopy determines the direction of travel of the chute transverse to its forward motion resulting from the towing means. If water is vented on one side of the drogue chute the drogue chute will move in the opposite direction. This technique is used in the present system to maintain the desired angle between the two legs of the array. Left and right drogue chutes are mirror images of each other with the maneuvering vents pointing towards the center of the array. When the drogue chute is running shallow, that is, is above the desired depth, weight 18 causes drogue chute 12 to rotate in a counter-clockwise direction as viewed in FIG. 4. This causes the maneuvering vents to be turned upward. This in turn causes the drogue to go deeper until it reaches the desired depth. Conversely, if the drogue chute is deeper than the desired depth the force exerted by buoyant means 16 exceeds the force exerted by weight 18 and drogue chute rotates so that the maneuvering vents are pointed down. This causes the chute to rise until it reaches the desired depth.

Because of the large diameter of the drogue chutes, a small forward motion is sufficient to keep them full and cause them to maneuver automatically to maintain the desired depth. The small movement is also sufficient to cause the drogue chute to create a drag on the two legs of the hydrophone array to maintain them in substantially straight lines at the predetermined angle.

It may be seen that there has been described herein a novel and improved hydrophone array. While the description herein is presently considered to be preferred, it is contemplated that further modifications and improvements within the purview of those skilled in the art may be made herein. The following claims are intended to cover all such variations and modifications as fall within the true spirit and scope of the invention.

What is claimed is:

1. A marine seismic detector array comprising:
   a tether line, one end of said tether line terminating in a bridle,
   a first and second elongated hydrophone array, one end of each of said elongated hydrophone arrays terminating at said bridle,
   a first and second maneuverable drogue chute, said first drogue chute attached to the other end of said first hydrophone arrays and said second drogue chute attached to the other end of said second hydrophone array, said drogue chutes oriented to maintain the predetermined angle between the said arrays,
   a first buoyancy means and a first weight means, said first buoyancy means and said first weight means attached to said first drogue chute for maintaining said first drogue chute at a predetermined depth,
   a second buoyancy means and a second weight means, said second buoyancy means and said second weight means attached to said second drogue chute for maintaining said second drogue chute at a predetermined depth.

2. The marine seismic detector array according to claim 1 wherein said first and second drogue chute each include a plurality of shroud lines and a canopy, one end of each of said shroud lines terminating in a pair of rings, the other ends of said shroud lines terminating on the annulus of said canopy, said canopy including
   a plurality of slot vents and at least one maneuvering vent.

3. The marine seismic detector array according to claim 1 wherein said buoyancy means are connected to said drogue chutes by a line and wherein said weight means are connected directly to the annulus of said drogue chute canopies.

4. The marine seismic detector array according to claim 3, further comprising means for towing said seismic detector array at sufficient speed to keep said first and second drogue chutes in a noncollapsed state to maintain tension on said hydrophone arrays.

5. The marine seismic detector array according to claim 4 wherein said towing means comprises a ship.

6. The marine seismic detector array according to claim 4 wherein said towing means comprises a parachute,
   a fourth buoyancy means, said parachute suspended just below the surface of the water by said fourth buoyancy means so that the said parachute is carried along by the surface currents.

7. The marine siesmic detector array according to claim 1, further comprising:
   a third buoyancy means and a third weight means, said third buoyancy means and said third weight means attached to said bridle for maintaining said bridle at a predetermined depth.

8. The marine siesmic detector array according to claim 7 including a first and a second line, said first line connecting said first drogue chute to said first buoyancy means and said second line connecting said second drogue chute to said second buoyancy means whereby said hydrophone array is maintained at a predetermined depth.

9. The marine seismic detector array according to claim 8 including means for towing said seismic detector array at sufficient speed to maintain said first and second drogue chute in a non-collapsed state to maintain tension on said hydrophone arrays.

10. The marine seismic detector array according to claim 9 wherein said towing means comprises a ship.

11. The marine seismic detector array of claim 9 wherein said towing means comprises a parachute,
    a fourth buoyancy means, said parachute suspended just below the surface of the water by said fourth buoyancy means so that the said parachute and detector array is carried along by the surface currents.

* * * * *